(12) United States Patent
Herman

(10) Patent No.: US 10,944,912 B2
(45) Date of Patent: Mar. 9, 2021

(54) SYSTEMS AND METHODS FOR REDUCING FLICKER ARTIFACTS IN IMAGED LIGHT SOURCES

(71) Applicant: Ford Global Technologies, LLC, Dearborn, MI (US)

(72) Inventor: David Michael Herman, Oak Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/431,510

(22) Filed: Jun. 4, 2019

(65) Prior Publication Data

US 2020/0389582 A1 Dec. 10, 2020

(51) Int. Cl.
*H04N 5/235* (2006.01)

(52) U.S. Cl.
CPC ......... *H04N 5/2353* (2013.01); *H04N 5/2351* (2013.01); *H04N 5/2357* (2013.01)

(58) Field of Classification Search
CPC .......... G03B 21/40; G09G 1/146; G01J 1/34; H04N 5/2353; H04N 5/2351; H04N 5/2357
See application file for complete search history.

(56) References Cited

U.S. PATENT DOCUMENTS

| | | | |
|---|---|---|---|
| 7,821,547 B2 * | 10/2010 | Suzuki | H04N 5/23293 348/226.1 |
| 9,975,551 B2 | 5/2018 | Kido | |
| 10,185,881 B2 | 1/2019 | Moosaei et al. | |
| 10,735,677 B2 * | 8/2020 | Matsumura | H04N 5/2353 |
| 2005/0157203 A1 * | 7/2005 | Nakakuki | H04N 5/2357 348/362 |
| 2013/0293745 A1 * | 11/2013 | Tamura | G03B 15/05 348/234 |
| 2014/0333825 A1 * | 11/2014 | Nakagawara | H04N 5/2353 348/362 |
| 2015/0084853 A1 * | 3/2015 | Li | G06F 3/03542 345/156 |
| 2016/0025568 A1 * | 1/2016 | Stein | G01J 3/28 356/402 |
| 2016/0096477 A1 | 4/2016 | Biemer | |
| 2016/0249003 A1 * | 8/2016 | Miwa | H04N 5/2353 |

(Continued)

OTHER PUBLICATIONS

Fairfield, N. et al., Traffic Light Mapping and Detection, (Research Paper), 2011 IEEE International Conference on Robotics and Automation, May 9-13, 2011 (6 pages).

*Primary Examiner* — Chiawei Chen
(74) *Attorney, Agent, or Firm* — Frank Lollo; Eversheds Sutherland (US) LLP

(57) ABSTRACT

Systems, methods, and computer-readable media are disclosed for reducing flickering artifacts in imaged light sources. Example methods may include receiving images corresponding to a scene captured by a camera; determining a light source in the scene using at least one artificial intelligence (AI)-based algorithm; determining, using an event-based camera, data representing flickering of the light source, the flickering having a frequency; determining, based on the data, that a time duration of overlap between an on state of the light source and an exposure time of the camera is below a threshold; and delaying the exposure time of the camera by a delay time to increase the time duration of overlap.

20 Claims, 6 Drawing Sheets

(56) References Cited

U.S. PATENT DOCUMENTS

| | | | |
|---|---|---|---|
| 2016/0252905 A1 | 9/2016 | Tian et al. | |
| 2016/0330359 A1* | 11/2016 | Ariga | H04N 5/2353 |
| 2016/0373684 A1* | 12/2016 | Sherman | B60R 1/00 |
| 2017/0094148 A1* | 3/2017 | Tsukagoshi | H04N 5/2357 |
| 2017/0300759 A1* | 10/2017 | Beard | G06K 9/6202 |
| 2017/0358103 A1* | 12/2017 | Shao | H04N 5/23238 |
| 2017/0366731 A1* | 12/2017 | Onodera | H04N 5/3532 |
| 2018/0102846 A1* | 4/2018 | Aoyama | H04B 10/54 |
| 2018/0138977 A1* | 5/2018 | Aoyama | H04B 10/116 |
| 2018/0336692 A1 | 11/2018 | Wendel et al. | |
| 2019/0149711 A1* | 5/2019 | Okuike | H04N 5/243 348/294 |
| 2019/0268072 A1* | 8/2019 | Aoyama | H04B 10/1141 |
| 2019/0278273 A1* | 9/2019 | Behrendt | G01C 11/06 |
| 2020/0022239 A1* | 1/2020 | Hung | H05B 45/14 |
| 2020/0344398 A1* | 10/2020 | Fruchtman | H04N 5/2353 |

\* cited by examiner

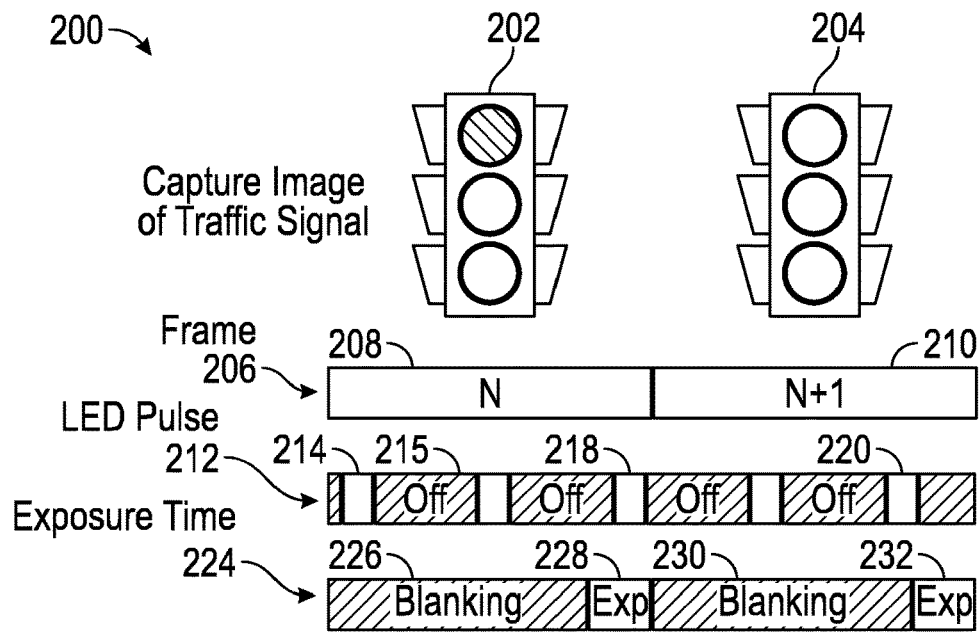
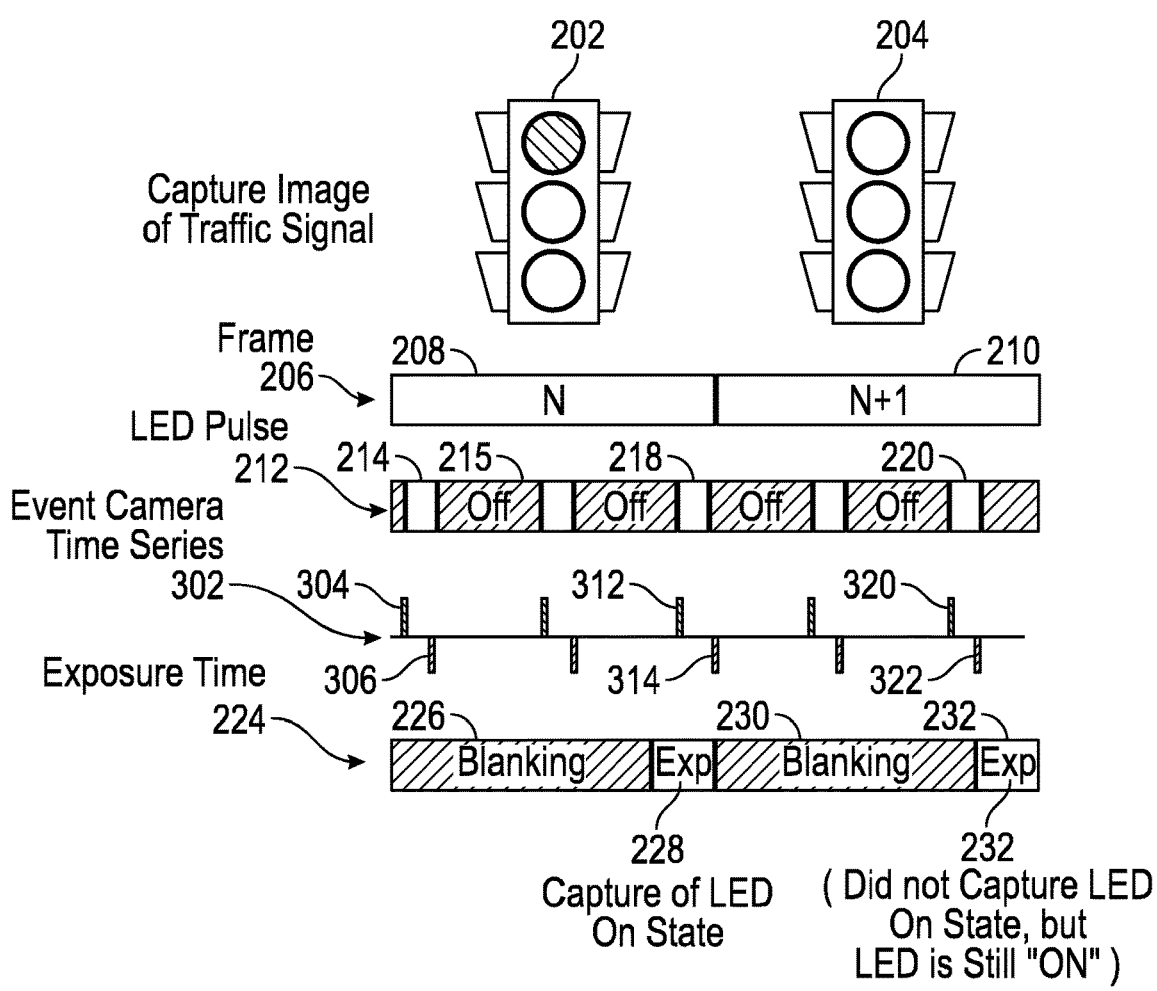
FIG. 3A

SYSTEMS AND METHODS FOR REDUCING FLICKER ARTIFACTS IN IMAGED LIGHT SOURCES

TECHNICAL FIELD

The present disclosure relates to systems and methods for reducing artifacts in images, and more specifically, to methods and systems for reducing flicker artifacts in imaged light sources.

BACKGROUND

Today's vehicles include various onboard sensors, such as sonar, radio detection and ranging (RADAR), and cameras, that are becoming commonplace as part of commercial driver-assistance systems. Such sensor systems may sense the environment at distinct time intervals and durations which may limited by the underlying electronic architecture and environment. With power steering, power brakes, and standardized feedback, vehicles can increasingly interact with the environment in which they drive.

One component of these vehicles can include a perception system, which allows the vehicle to computationally analyze and interpret its surroundings. Perception systems can use various sensing modalities, such as RADAR and light detection and ranging (LIDAR). The perception systems may use cameras to sense light sources (e.g., traffic lights, vehicle headlights and flashers, and the like) in the vehicle's environment. However, these light sources can have artifacts such as flicker (e.g., the change in brightness of a light source over time). In general, light emitted from light sources may vary in strength as function of time, either intentionally or unintentionally. Intentional light variations may be applied for warning and signaling (e.g., traffic-light signaling) with the purpose that the flicker is perceived by people. However, the light output of the light source may also have unintentional light level modulations due to the light source itself. The magnitude, shape, periodicity, offset, and frequency of these temporal light modulations may depend on many factors such as the type of light source, the electrical supply frequency, the driver or ballast technology, and the type of light regulation technology applied (e.g., pulse-width modulation, PWM). These unintentional light-level modulations may interfere with the perception system of vehicles. In particular, the flickering effects may cause the perception systems to incorrectly determine that a particular light source is in a given state (e.g., off state), when in fact the light source is in a different state (e.g., an on state).

Due to the temporal nature of sensor and lighting elements, a sensor may not always correctly detect a light source as being active. The sensor may also detect the light source in some frames and not detect the light source under other frames. These errors may result in the vehicle or related devices in making incorrect conclusions about the current status of light sources (e.g., traffic lights) in the vehicle's environment.

Therefore, systems and methods are needed to reduce flicker artifacts in imaged light sources.

BRIEF DESCRIPTION OF THE DRAWINGS

FIG. 2 shows timing diagrams associated with a light source and a camera exposure time, in accordance with example embodiments of the disclosure.

FIG. 3A shows additional timing diagrams associated with a light source, an event-based camera, and a camera exposure time, in accordance with example embodiments of the disclosure.

DETAILED DESCRIPTION

Overview

Figure 1:
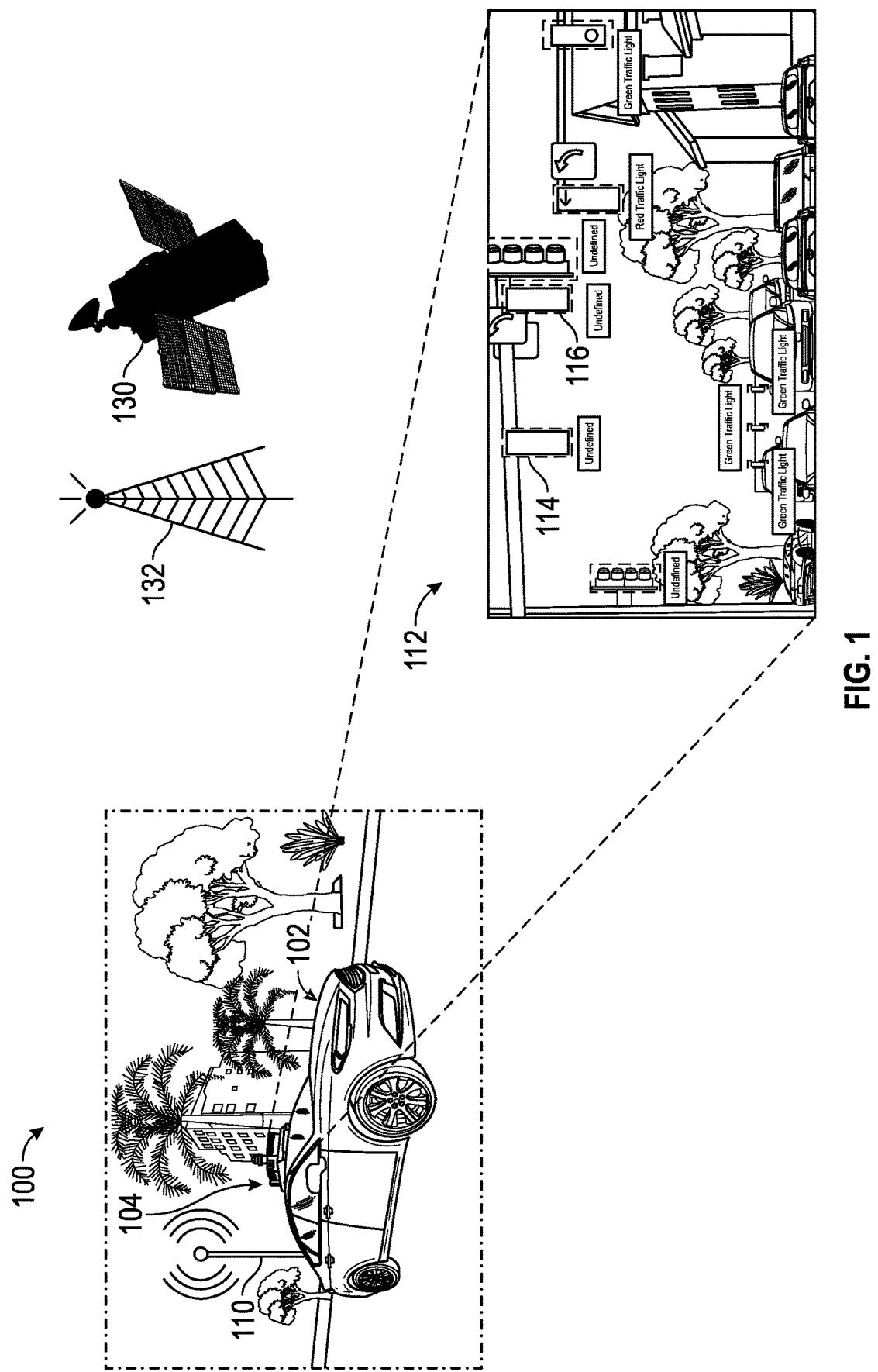
FIG. 1 shows a diagram of an example environmental context for vehicle navigation including example light sources exhibiting flickering artifacts, in accordance with example embodiments of the disclosure.

With Autonomous vehicles, computer vision tasks may be challenging due to the variety of outdoor conditions that may influence traffic light, vehicle light visibility, or the visibility of any other light source affecting the perception of autonomous vehicle operations or related supporting systems. For example, a camera with fixed gain, exposure, and aperture can be calibrated to identify traffic light color levels, illumination levels, and/or geometry to determine the light's status under ambient lighting conditions. However, as noted, the light sources that can have artifacts such as temporal light modulations referred to as flicker, which may interfere with vehicle perception systems. In particular, the flickering effects may cause the perception systems to incorrectly determine that a particular light source is in a given state (e.g., off state), when in fact the light source is in a different state (e.g., an on state). Alternatively, the camera may detect the light source in a given state (e.g., off state) in some image frames and detect the light source is in a different state (e.g., an on state) in other frames.

These light source flicker artifacts can lead to errors in detection by camera systems in vehicle perception systems including advanced driver-assistance systems (ADAS) and AV perception systems. In some cases, the flickering of the light source may cause certain computer vision-based algorithms to exhibit varying bounding boxes around light sources. In some cases, light source flicker may result from a pulse-width modulation (PWM) control mechanism. PWM can refer to a method of reducing the average power delivered by an electrical signal, by effectively chopping it up into discrete parts. In PWM, the average value of voltage fed to the load can be controlled by turning the switch between supply and load on and off at a given frequency. This mechanism can result in periods where the light source is turned off and other periods where the light source is turned on. PWM may be used to control light sources in a variety of applications such as in traffic lights, signage, billboards, illuminated road signs, vehicle lighting, and the like. The frequency of switching power to the light source using PWM may be high enough to be unnoticeable by the human eye. That is, the light source can appear to have constant illumination to the human eye. However, cameras may have exposure times which may not always synchronize with the on periods of the light sources, leading to incorrect light source state determination. Furthermore, a camera may collect multiple images of a scene under varying exposures to create an image having a higher dynamic range. In this process, the light source may be active in some images but not in others thus affecting a computation of the intensity levels in the image. This process may be further complicated with the use of complementary metal-oxide-semiconductor (CMOS) cameras. In particular, with CMOS cameras specific rows of the camera sensor may be exposed such that part of light source may be imaged as being on while the other part of the light source may be off during that portion of the camera's exposure. In addition, different light sources (for example, different light sources on the same vehicle or on the same traffic signal) may be driven by different PWM controllers, and the timing between PWM controllers may also be unsynchronized. This lack of synchronization of more than one light source frequencies may also lead to incorrect light source state determination.

The disclosure is generally directed to systems and methods for using the output of an event-based camera to detect and filter out the effects of light source flickering from a conventional camera. In some cases, the output of the event-based camera may include a time series that represents the on and off states of a light source that is imaged, and the disclosed systems may predict a future power state of the light source from the time series data. The disclosed systems can then modify a duration or periodicity of the conventional camera's exposure time to synchronize the conventional camera's imaging with the predicted power state of the light source. In some examples, the light source may include a light-emitting diode (LED) and the camera can include any suitable sensor that can detect light output from the environment in a given locality. Non-limiting examples of a suitable sensor can include a complementary metal-oxide-semiconductor (CMOS) based camera and/or charge-coupled device (CCD)-based camera. Other examples of a sensor can include a mechanical light detection and ranging (LIDAR) with varying spin speed and/or offset to image the light source, a time-of-flight (TOF) camera, a flash LIDAR, or the like. In other aspects, the disclosed systems are able to detect and filter out the effects of light source flickering at relatively further working distances between the cameras and the light source (e.g., a distance exceeding about 20 meters).

More specifically, in some examples, the disclosed systems can perform object detection or tracking to detect light sources in the environment of the vehicle by using the conventional camera. Such light sources may include, but not be limited to, headlights, traffic signals, bus signage, and/or the like. Further, the disclosed systems can use map information (e.g., high-definition (HD) map information) of road signage incorporating light sources (e.g. traffic lights) to assist the cameras in locating the light source for imaging purposes. In some examples, the vehicle may be moving; thus, an event camera's pixels may become brighter and darker as the object moves in the scene and this intensity change may further vary due to flickering effects. Accordingly, the disclosed systems can perform a fusion of vehicle state and other sensors to detect and/or extract the flicker information from data representing the overall time-series variation of the data generated by the vehicle's camera pixels when vehicle is moving.

The disclosed systems can detect light source flicker by using feature recognition and/or a time series-based technique to extract a characteristic frequency of the flicker from data associated with the event-based camera's images. In some examples, the disclosed systems can use data from the event-based camera along with map information to track time-series data reflecting changes to the light source's intensity across pixels of the event-based camera or conventional camera. In other aspects, the disclosed systems can review current and historical image data from the event-based camera to distinguish between an off state of the light source and a flickering of the light source. Further, the disclosed systems can use the historical data to predict future on states of the light source and delay the exposure time of the conventional camera for a predetermined duration. This delaying of the exposure time of the conventional camera can allow for the image captured by the camera to be temporally aligned with the predicted light sources on state. Alternatively or additionally, the disclosed systems may re-order the high-dynamic-range by multi-imaging, can image a sub-region of the image to save time, can vary a rolling shutter's trigger and/or read out mechanisms, and/or the like. In some aspects, the disclosed systems can detect potential flickering of a given light source by using an event-based camera. In some cases, the event-based camera may include a relatively large field of view (e.g., a camera having a fish eye lens or a 360-degree camera) and one or more conventional cameras (e.g., a CMOS camera and/or a CCD camera). Alternatively or additionally, the disclosed systems can use one event based camera and multiple high-resolution cameras around the vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As noted, light source flicker artifacts can lead to errors in detection by camera systems in vehicle ADAS and AV perception systems. In some cases, an event-based camera can be used to reduce errors in detecting a light source's state arising from flicker artifacts. Such event-based cameras can have relatively high temporal response rates and relatively high dynamic ranges in comparison to conventional cameras. Further, the output of the event-based camera can be inputted to an engine control unit (ECU) or domain controller, for example, using edge processing techniques at the camera's printed circuit board (PCB). In some examples, event-based cameras may require the use of larger pixel sizes, approximately 15 micrometers to approximately 18.5 micrometers, which may limit the resolution of such event-based cameras from about 320 by 240 pixels up to about 640 by 480 pixels (equivalent to about 0.3 megapixels, MP). Camera resolutions for ADAS applications may be about 8 MP and camera resolutions for AV applications may be about 16 MP. Accordingly, an approximately 0.3 MP resolution may be too low for certain automotive applications, as described in the following example.

In one example, event-based camera can have a 480-pixel vertical resolution and a 45.6-degree vertical resolution. This configuration can result in an angular resolution of about 0.095 degrees/pixel (or equivalently, about 10.5 pixels/degree). The vertical distance of a traffic light, a common light source flicker target for imaging in automotive applications, may be approximately 1 meter. A calculation of the pixels for object detection and tracking along with the identification of a light source (e.g., using an image processing algorithm) can identify a distance threshold that represents the maximum distance between the camera and the light source that ensures adequate resolution for flicker detection. For example, an example calculation may assume about 3 pixels per LED and 1 pixel between LEDs in a traffic light to obtain total pixel count of 11 for the traffic light. At a vehicle speed of around 30 to 50 miles per hour, there may be a cutoff stopping distance where an event-based camera at current resolutions may not be able to identify individual lights on the traffic light depending on typical assumptions of stopping distance and braking rate for a given vehicle. Accordingly, an event-based camera having certain resolutions may be insufficient to overcome light source flickering in some scenarios. Moreover, the use of a wider field-of-view lens or a more rigorous requirement in pixel count may further lower the distance threshold, leading to increased camera resolution requirements, which may drive up complexity and cost and be unfeasible for certain ADAS and/or AV applications.

As described above, conventional systems may be inadequate in interpreting light source flicker Further, while an event-based camera may offer several advantages for ADAS and/or AV applications including light source flicker, an event-based camera may have a lower resolution that may be insufficient identify flickering light sources correctly at the ranges required in several ADAS and/or AV applications (e.g., in order to determine if a given traffic signal is active or inactive) Certain cameras including, for example, rolling-shutter CMOS sensors, may offer sufficient resolution for the detection of light sources such as LEDs. However, other factors such as (1) a time delay associated with blanking and frame-to-frame time gaps and (2) the complications of a rolling shutter may result in a large window where a light on state can be missed or confused (e.g., the camera may be unable to distinguish between flashing versus an on state for the camera). Further, the exposure times of CMOS-based cameras and the operating frequency of LED PWMs may not be consistent or standardized. Furthermore, the exposure time of the camera may vary based on the ambient light environment. For example, a camera may have short exposures during bright day light and long exposure at twilight or at night time.

In other examples, multi-exposure high-dynamic-range imaging (HDRI) and rolling-shutter technologies may create additional artifacts that may increase the effects of flickering. Rolling shutter can refer to a method of image capture in which a still picture (in a still camera) or each frame of a video (in a video camera) is captured not by taking a snapshot of the entire scene at a single instant in time, but rather by scanning across the scene rapidly, either vertically or horizontally. Accordingly, not all parts of the image of the scene are recorded at the same instant. During playback, the entire image of the scene can be displayed at once, as if it represents a single instant in time. This produces distortions of fast-moving objects or rapid flashes of light. HDRI can refer to a high dynamic range (HDR) technique used in imaging and photography to reproduce a greater dynamic range of luminosity than is possible with standard digital imaging or photographic techniques. HDR images can represent a greater range of luminance levels than can be achieved using more traditional methods, such as many real-world scenes containing bright, direct sunlight to extreme shade. HDRI can be achieved by capturing and then combining several different, exposures of the same subject matter. The additional complications arising from HDRI and rolling-shutter imaging may represent additional difficulties in automotive perception. Conventional systems may use high-speed cameras, that is, devices capable of capturing moving images with exposures of less than about $\frac{1}{1,000}^{th}$ of second or frame rates in excess of about 250 frames per second. However, high-speed cameras can have many drawbacks, including cost, data consumption rates, power requirements, active cooling, and the like, which can impede its use as a workable solution for many applications such as automotive applications.

Embodiments of the disclosure describe systems and methods for providing temporal sensor fusion between conventional (e.g., CMOS-based) camera sensors and event-based camera sensors to aid in detection of light source flicker. In some examples, embodiments may enable the detection of light source flicker at relatively longer working distances (e.g., distances above a predetermined threshold such as about 20 meters) between the camera and the light source. In some cases, the disclosed systems may predict the timing of a light source on state to facilitate camera exposure during the light source's on state. In other cases where a light source's on state is not captured, the disclosed systems may use sensor fusion along with event-based cameras to determine a light source's actual state. Accordingly, the disclosed systems may generate information that may provide improved perception and understanding of the environment leading to increased efficiency for ADAS and AV applications.

As used herein, "event-based cameras" can refer to cameras that output pixel-level brightness changes instead of standard intensity frames. Event-based cameras may differ from conventional cameras in several respects. In particular, if conventional cameras operate at relatively high speeds, images may suffer from motion blur that may cause eye-tracking algorithms to fail. Further, the frame rate of a conventional camera may be limited and may thus provide an upper bound on the achievable the amount of delay associated with eye-tracking algorithms and/or systems. Moreover, the higher the frame rate of a conventional camera, the more data may need to be processed. This may increase power consumption of the conventional camera even if images are redundant in time. Event-driven cameras, on the other hand, may include independent, asynchronous sensing elements (e.g., pixels). The sensing elements may react to local illumination changes in real time. Such illumination changes may results from camera motion, object motion, or changes in the lighting in the environment.

The event-based camera can have an output that registers a stream of events. The events may correspond to situations where a photocurrent of the sensing elements of the event-based camera changes by a predetermined and configurable amount. Further, the photocurrent of a sensing element may be proportional to the change in brightness of radiation illuminating the sensing elements.

Event-driven cameras may offer advantages over conventional cameras. In particular, event cameras may provide lower latency and higher temporal resolution that conventional cameras. Event-driven cameras may reduce the amount of delay associated with input changes, which may be on the order of microseconds. Event-driven cameras may provide a higher dynamic range as compared with conventional cameras. This may be because each sensing element of an event camera may be independently driven and may operate at its own given set point. Event-driven cameras may include high intra-scene dynamic ranges. In some examples, the disclosed systems can adjust this set point or data priority based on the detection (e.g., via a CMOS-based camera) of possible light source, (e.g. light sources such as traffic lights that are in an off state).

Event-driven cameras may require a relatively low bandwidth usage, at least because event-driven cameras report sensing element-level illumination changes. Accordingly, additional bandwidth may not be required if sensing elements do not change in value (e.g., if there is no relative motion between a given scene and an event-driven camera or there if are no environmental illumination changes). This may reduce the complexity of the backend electronics of an event-driven camera in comparison with conventional cameras. Event-driven cameras may require relatively low power as compared with conventional cameras. An event-driven camera may require less power because the analog-to-digital converters (ADCs) of the event-driven camera required for sensing element readout may consume relatively less power as a result of not being operational as frequently as in conventional cameras.

As used herein, a "charge-coupled device (CCD)" camera or sensor may refer to a camera including a sensor array that has a particular mechanism for how charge is read and processed. In particular, the CCD camera's sensor array may be configured such that the sensor array transports built-up charge across the sensor array without compromising image quality. The CCD sensor array may include several rows of sensing elements which are read into output registers and are in turn, fed into respective amplifiers and ADCs. As each row of the CCD sensor array is read, it may be transferred out of a corresponding readout register, and another row of the CCD sensor array may be read into the register. Further, successive rows follow in turn in the readout process, leading to digital data that may be stored or manipulated.

The camera may include a CMOS camera that includes a sensor array that may be fabricated from a CMOS wafer. The disclosed systems may use a CMOS camera or a CCD camera based on any number of parameters. In some examples, a CMOS sensor array may provide less power consumption and may allow for more complex circuitry on the backend of the sensor array as compared with a CCD sensor array. A given sensing element of a CMOS-based sensor array may include three or more transistors to drive and read the incident radiation on the CMOS sensor array. In particular, the transistors may allow for a local processing of the data on the transistor of each sensing element, and each sensing element may be accessible independently from other sensing elements. CMOS-based transistors may include higher noise as compared with CCD sensor arrays as a result of the transistors taking up a portion of the area of the CMOS transistor. The CMOS-based sensor array may include additional amplifiers such as column amplifiers for each column of an array.

ILLUSTRATIVE EXAMPLES

FIG. 1 shows a diagram of an environmental context for vehicle communication using dynamically configurable interaction modes, in accordance with example embodiments of the disclosure. FIG. 1 represents an environmental context 100 that includes a vehicle 102. In some examples, the vehicle 102 may include an autonomous vehicle (AV). In some examples, the vehicle 102 may include cameras 104. Cameras 104 may further include event-based cameras and/or any suitable light-sensitive sensors including, but not limited to, CMOS-based cameras and CCD-based cameras. The disclosed systems can use the cameras 104 to capture a scene 112. The scene 112 may include roadside signage, infrastructural components, cyclists, pedestrians and other vehicles which may be capable of outputting illumination. As used herein, an "infrastructural component" may include road and highway networks including signage and markings, electrical systems (street lighting and traffic lights), and/or the like.

In some examples, the scene 112 may include various traffic signals such as a first traffic signal 114 and a second traffic signal 116. The disclosed systems may implement any suitable artificial intelligence (AI)-based algorithm (e.g., machine vision algorithms, pose-detection algorithms, neural networks, and/or the like) to identify the various traffic signals and distinguish between different traffic signals in the same scene (e.g., distinguish between the first traffic signal 114 and the second traffic signal 116). In some cases, the traffic signals may include a plurality of light sources (e.g., light-emitting diodes (LEDs) such as a red LED, a yellow LED, and a green LED). The disclosed systems may distinguish between the different light sources within a given traffic signal in addition to distinguishing between the traffic signals themselves.

While this example environmental context 100 primarily involves traffic signals, it is to be understood that the disclosed systems and methods may be used in a variety of other transportation scenarios in different environments. For example, the disclosed systems may detect various light sources associated with vehicles (e.g., flashers, turn signals, daytime running lights, Christmas decoration lights, Menorah lights, etc.) and perform the operations described herein to reduce the flickering artifacts in images of such light sources.

The disclosed systems may use a conventional camera (e.g., camera 104 of vehicle 102) to perform object detection. The object detection can serve to detect potential light sources in the field of view 112 of the conventional camera. Such potential light sources can include, but not be limited to, car headlights, traffic signals, bus signage, and the like. The disclosed systems may also use object-tracking algorithms to track vehicles and other non-stationary objects. In other embodiments, the disclosed systems may use the object-tracking algorithms to track objects that are in relative motion with respect to the vehicle in which the camera (e.g., event-based camera and/or conventional camera) is installed and mounted.

In some examples, the disclosed systems may access and use high-definition (HD) map information from external devices (for example, external servers and/or cloud-based servers, not shown), which may be accessible via the antenna 110. In some examples, the antenna 110 can be in communication with satellites such as satellite 130 and/or cell towers such as cell tower 132 to obtain such information. The HD map information may include road signage information indicating the location of various road signs.

The road signage information can incorporate light sources such as traffic lights which can be observed by the cameras and analyzed via the techniques described herein. In other examples, the disclosed systems can implement any suitable localization method to precisely locate the light sources by using the HD maps, as described further below.

As noted, the disclosed systems may perform light-source LED flicker detection using an event-based camera as part of the cameras 104 of the vehicle 102. In particular, the event-based camera can perform feature recognition and/or time series-based identification of characteristic frequencies in the detected images. In some examples, the disclosed systems may use such feature recognition and/or time series-based identification to detect a PWM light source. Further, because of the time-series nature of light source flicker detection during the motion of the cameras 104 of the vehicle 102, the disclosed systems may perform a localization technique to localize the vehicle 102 in space and track objects around the vehicle 102. For example, an oncoming traffic light's pulsating LED flicker may appear to translate across images generated by a camera due to the vehicle's motion while the traffic light in the real world remains stationary. In another example, the disclosed systems may implement a tracking algorithm to track another vehicle's light sources (e.g., taillights or flashers), because the flickering may need to be tracked since both the host and target vehicle may be traveling with respect to one another.

In one example, the disclosed systems may implement a tracking algorithm to track flickering light sources by tracking the frequency of the PWM used to control the light source. In this example, the corresponding data stream generated by the event-based camera may be higher than the relative pixel motion of the light source. In another example, the light source may include two frequencies or two magnitudes corresponding to on and off states of the vehicle, and the frequencies may have different magnitudes. For example, the light source may include an active LED turn signal of a vehicle, where the PWM frequency is relatively high. The same light source may further include an on-off frequency of the turn signal that may be slower than the PWM frequency. In this case, the disclosed systems may filter out the slower PWM frequency form the data generated by the event-based camera, and only consider the faster frequency for determining the on state of the light source and for reducing the flickering artifacts associated therewith. Alternatively or additionally, the disclosed systems can transition to a daytime running light and/or apply a color filter fusion between greyscale image of an event camera and a color image of a CMOS-based camera.

In some cases, the disclosed systems may implement a tracking algorithm to track the vehicle 102 to translationally match different pixels in different images that correspond to on and off events that originate from the same light source. This tracking may be performed using the event-based camera and/or the conventional camera. For example, a vehicle 102 may travel past a fixed light source such as a traffic light. The vehicle's 102 path in different images taken by the camera 104 may be obtained based on a determination of the vehicle's 102 motion and the physical space around the vehicle 102. In some examples, the disclosed systems may fuse the data generated by the event-based camera and the conventional camera with the HD map-based information to track and record the time series of the light source's intensity changes with motion across pixels over time. In some examples, the event-based camera can be used for pose estimation, visual odometry, and simultaneous localization and mapping (SLAM). Using such techniques, the disclosed systems may use the motion of the vehicle 102 in the environment to filter scene motion that may mimic the appearance of light source flicker. For example, the disclosed systems can filter outlier intensities to validate light source flicker. As the light source flicker may be common and have relatively well-defined characteristics, the disclosed systems can more readily perform such filtering using digital signal processing (DSP)-based filtering techniques.

In some examples, the disclosed systems can use the data from conventional camera and event-based camera pixel maps to determine additional information about the state of the light sources. For example, the field of view of the two cameras can be such that the event-based camera has a lower resolution compared to a CMOS-based camera. In such a case, a single pixel of light source flicker may correspond to multiple pixels (for example, a pixel array of 10 by 10 elements) being excited in the CMOS-based camera. In other cases, the light source flicker may be compounded with distortion, varying vehicle position, field of view differences between the CMOS-based camera and the event-based camera, and/or the like. Accordingly, the mapping may become more complex than in situations without such compounding distortions; however, the disclosed systems may still perform the mapping using sensor fusion between the different camera types. After capturing a given sub-region in the field of view of the CMOS-based camera (e.g., a 10 by 10 pixel region), the disclosed systems can subdivide the location may into potential individual light sources such as portion of bus signage, individual vehicle lighting, and the like.

In some cases, the light source may be close to the event-based camera, and the event-based camera can be used to determine the state of the object. This determination may be based on the light source's complexity (e.g., number and shape of smaller light sources composing the light source) and the distance from the event-based camera. In some examples, the disclosed systems can measure the distance to the object using sensor fusion (for example, using stereo cameras, LIDAR, RADAR, HD-map data, and the like). In other aspects, the disclosed systems can determine the distance of the object based on object detection and/or recognition using the camera itself. The complexity of the object may depend on the object's type. For example, a traffic light may have three light sources that may be visible with a known geometry. In comparison, an LED array on a bus may contain multiple small LEDs with varying PWM frequencies and offsets. As such, the critical distance for the bus sign may be closer than the traffic light.

The vehicle 102 may include any suitable vehicle such as a motorcycle, car, truck, recreational vehicle, etc., and may be equipped with suitable hardware and software that enables it to communicate over a network, such as a local area network (LAN). As noted, the vehicle 102 may include an AV as shown and described in connection with FIG. 6, below.

In another embodiment, the vehicle 102 may include a variety of sensors that may aid the vehicle in locating light sources such as traffic signals based on maps (e.g., HD maps). The sensors may include RADAR, LIDAR, cameras, magnetometers, ultrasound, barometers, and the like (to be described below). In one embodiment, the sensors and other devices of the vehicle 102 may communicate over one or more network connections. Examples of suitable network connections include a controller area network (CAN), a media-oriented system transfer (MOST), a local interconnection network (LIN), a cellular network, a Wi-Fi network, and other appropriate connections such as those that conform with known standards and specifications (e.g., one or more Institute of Electrical and Electronics Engineers (IEEE) standards, and the like).

In some examples, the vehicles 102 may include various location-determination devices in addition to satellite-based location-determination devices. These devices may be used to identify the location of light sources such as traffic lights, track the vehicle on a map (e.g., an HD map), track other light sources on other vehicles in proximity to the vehicle, provide updates on the location of a given vehicle to other vehicles, and generally support the operations described herein. For example, the vehicles 102 may include magnetic positioning devices such as magnetometers, which may offer an indoor location determination capability. Magnetic positioning may be based on the iron inside buildings that create local variations in the Earth's magnetic field. Un-optimized compass chips inside devices in the vehicle 102 may sense and record these magnetic variations to map indoor locations. In one embodiment, the magnetic positioning devices may be used to determine the elevation of the vehicle 102. Alternatively or additionally, a barometer device may be used to determine the elevation of the vehicle 102. In another embodiment, barometers and pressure altimeters may be a part of the vehicle and may measure pressure changes caused by a change in altitude of the vehicles 102.

In one embodiment, the vehicle 102 may use one or more inertial measurement devices (not shown) to determine the respective vehicles' position in order to track the vehicles and/or to determine the location of various light sources in the vehicle's environment with respect to a map (e.g., an HD map). The vehicles 102 may use dead reckoning and other approaches for positioning of the vehicle using an inertial measurement unit carried by the vehicles 102 sometimes referring to maps or other additional sensors to constrain the inherent sensor drift encountered with inertial navigation. In one embodiment, one or more microelectromechanical systems (MEMS) based inertial sensors may be used in the inertial measurement unit of the vehicle; however, the MEMS sensors may be affected by internal noises which may result in cubically growing position error with time. In one embodiment, to reduce the error growth in such devices, a Kalman filtering based approach may be used, by implementing software algorithms on software modules associated with the various devices in the vehicle 102.

In one embodiment, the inertial measurements may cover one or more differentials of motion of the vehicle 102, and therefore, the location may be determined by performing integration functions in the software modules, and accordingly, may require integration constants to provide results. Further, the position estimation for the vehicle 102 may be determined as the maximum of a two-dimensional or a three-dimensional probability distribution which may be recomputed at any time step, taking into account the noise model of all the sensors and devices involved. Based on the vehicles' motion, the inertial measurement devices may be able to estimate the vehicles' locations by one or more artificial intelligence algorithms, for example, one or more machine learning algorithms (e.g., convolutional neural networks). The disclosed systems may use any of the devices mentioned above in combination with the location-determination signals to determine the location of the vehicle, determine the location of other vehicles, and/or determine the location of various light sources in the vehicle's environment.

In some examples, the disclosed systems can use an indoor positioning system (IPS) in connection with certain infrastructural components to determine the location of the light sources with increased accuracy. Further, the IPS may be used to determine the location of the vehicle on a map (e.g., an HD map), for example, in locations where satellite navigation signals are inadequate. In particular, an IPS may refer to a system to locate objects (e.g., the vehicle 102) inside a building such as a parking structure using lights, radio waves, magnetic fields, acoustic signals, or other sensory information collected by mobile devices (e.g., user devices or vehicle devices). IPS's may use different technologies, including distance measurement to nearby anchor nodes (nodes with known fixed positions, e.g. Wi-Fi and/or Li-Fi access points or Bluetooth beacons, magnetic positioning, and/or dead reckoning). Such IPSs may actively locate mobile devices and tags or provide ambient location or environmental context for devices to get sensed. In one embodiment, an IPS system may determine at least three independent measurements to unambiguously find a location of a particular vehicle 102 or a light source.

In some examples, the vehicle antennas (for example, antenna 110) may include any suitable communications antenna. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the vehicles. For example, the disclosed systems may transmit signals to other vehicles to inform the other vehicles to take at least one action (e.g., brake, accelerate, make in turn, and/or the like) based on a determination of the state of the light sources. In various aspects, the transmitted and/or receive signals may be based on the results of the detected states of the light sources, which may be more accurately determined by the implementation of the disclosed operations.

In some examples, the vehicle 102 may have on-board units (not shown) may include microcontrollers and devices that can communicate with each other in applications without a host computer. The on-board unit may use a message-based protocol to perform internal communications. Further, the on-board unit can cause a transceiver to send and receive message (for example, vehicle-to-everything, V2X, messages) to and from infrastructural components and to other vehicles' on-board units.

Further, various devices of the vehicle 102 and/or infrastructural components (e.g., smart traffic signals, roadside units, IPS systems, and/or the like) may include any suitable radio and/or transceiver for transmitting and/or receiving radio frequency (RF) signals in the bandwidth and/or channels corresponding to the communications protocols utilized by any of the vehicle devices to communicate with each other and/or with infrastructural components. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Typically, when an example vehicle 102 establishes communication with another vehicle (not shown) and/or establishes communication with a infrastructural component device, the vehicle 102 may communicate in the downlink direction by sending data frames (e.g. a data frame which can comprise various fields such as a frame control field, a duration field, an address field, a data field, and a checksum field). The data frames may be preceded by one or more preambles that may be part of one or more headers. These preambles may be used to allow the user device to detect a new incoming data frame from the vehicle device. A preamble may be a signal used in network communications to synchronize transmission timing between two or more devices (e.g., between the vehicle 102 device and infrastructural component device and/or between the devices of separate vehicles). As noted, the data frames may be used to transmit information between vehicles so that a given vehicle may perform at least one action as a result of the detection of an on or off state of a light source. Nonlimiting examples of such actions include breaking, turning, accelerating, turning on hazards, and/or the like.

In another aspect, the environmental context 100 may include one or more satellites 130 and one or more cellular towers 132. The satellites 130 and/or the cellular towers 132 may be used to obtain information from various databases such as databases having HD maps. In other aspects, the disclosed systems may transmit information associated with light sources (e.g., the light sources' respective locations, the light sources' respective states, and/or the like). As noted, the vehicle 102 may have transceivers, which may in turn may include one or more location receivers (e.g., global navigation satellite system (GNSS) receivers) that may receive location signals (e.g., GNSS signals) from one or more satellites 130. In another embodiment, a receiver may refer to a device that can receive information from satellites (e.g., satellites 130) and calculate the vehicles' geographical position.

In some examples, the vehicles (e.g., such as vehicle 102) may be configured to communicate using a network, wirelessly or wired. As noted, the communications may be performed between vehicles, for example, to inform a given vehicle to an action to take based on the state of a light source. The network may include, but not limited to, any one of a combination of different types of suitable communications networks such as, for example, broadcasting networks, public networks (for example, the Internet), private networks, wireless networks, cellular networks, or any other suitable private and/or public networks. Further, any of the communications networks may have any suitable communication range associated therewith and may include, for example, global networks (for example, the Internet), metropolitan area networks (MANs), wide area networks (WANs), local area networks (LANs), or personal area networks (PANs). In addition, any of the communications networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

In some examples, the disclosed systems may analyze map information associated with an environment of the vehicles, previous vehicle locations in a given environment, light source locations, infrastructural updates regarding the transportation network (for example, light sources that are powered off due to construction or other activities) and/or the like. The database may be controlled by any suitable system, including a database management systems (DBMS), discussed further in connection with FIG. 7, below. The DBMS may use any of a variety of database models (for example, relational model, object model, etc.) and may support any of a variety of query languages to obtain information from database. In some examples, the database may include a cloud-based database or a vehicle-based database.

FIG. 2 shows timing diagrams associated with a light source and a camera exposure time, in accordance with example embodiments of the disclosure. Diagram 200 includes a first image 202 of a traffic signal having an LED in the on state and a second image 204 of the traffic signal that is still in the on state, although the traffic signal appears to be off due to flickering. The images may be captured in frames 206 based on a frame rate and may be taken by a camera such as a CMOS-based camera or a CCD-based camera. The first image 202 can correspond to a first frame N 208 and the second image 204 can correspond to a second frame N+1 210.

Diagram 200 further shows a timing diagram 212 of an LED power pulse. The timing diagram 212 shows intervals where a circuit can provide power to the LED and other intervals where the circuit does not provide power to the LED. This may be due to the fact that the circuit may be an alternating current (AC) power source that operates at a given frequency. In particular, interval 214 represents a situation where the circuit provides power to the LED, while interval 215 represents a situation where the circuit is not actively providing power to the LED. As discussed further below, intervals 218 and 220 represent intervals that overlap and do not overlap with exposure interval 228 and exposure interval 232, respectively.

Diagram 200 further shows a timing diagram 224 of an exposure time associated with the camera. As shown, timing diagram 224 includes blanking intervals such as blanking interval 226 and blanking interval 230. The blanking intervals may represent intervals where the camera does not capture images and may therefore miss an on state of a pulsating light source such as the traffic light's LED. Additionally, timing diagram 224 includes exposure intervals such as exposure interval 228 and exposure interval 232. The exposure intervals represent intervals in which the camera takes an image of the light source. Accordingly, in order for the camera to capture and on state of the light source there must be adequate overlap between an interval associated with the power to the light source (such as interval 218 or interval 220) and an exposure interval (such as exposure interval 228 and/or exposure interval 232). In the example shown in diagram 200, there is adequate overlap between interval 218 and exposure interval 228. Accordingly, the camera may correctly capture the on state of the light source in this cycle of the timing diagram. However, diagram 200 illustrates that there is not sufficient overlap between interval 220 and exposure interval 232. Accordingly, the camera may not capture and on state of the light source during this cycle of the timing diagram and a perception system may incorrectly assume that the light source is off even though the light source is in fact merely flickering.

FIG. 3A illustrates additional timing diagrams associated with a light source, an event-based camera, and a camera exposure time, in accordance with example embodiments of the disclosure. Diagram 300 represents a diagram similar to diagram 200 of FIG. 2, shown and described above, with some notable differences. In particular, diagram 300 further includes a timing diagram 302 of a time series of an event-based camera. The timing diagram 302 includes a positive trigger such as positive trigger 304 and a negative trigger such as negative trigger 306. In particular, the positive trigger causes the event-based camera to turn on and can be triggered by the detection of a turning off to a turning on event associated with the light source. Similarly, the negative trigger can cause the event-based camera to turn off and can be triggered by the detection of a turning on to a turning off event associated with the light source.

As shown in diagram 300, the timing diagram 302 is periodic and can have an associated frequency that may follow the periodicity of timing diagram 212. This is because, as noted, the light source may have a periodic behavior and the event-based camera is configured to turn on and off based on changes in the luminance of the light source. Diagram 300 further shows that the event-based camera may be turned on during positive trigger 312 that aligns with an on state 218, and that the event-based camera may be turned off after the negative trigger 314 that aligns with an off state of the light source. Similarly, diagram 300 shows that the event-based camera may be turned on during positive trigger 320 that aligns with an on state 220 and that the event-based camera may be turned off after the negative trigger 322 that aligns with an off state of the light source.

In the case involving positive trigger 312 and negative trigger 314, the camera may undergo an exposure event as depicted by exposure interval 228 which can align with the duration between the positive trigger 312 and the negative trigger 314 and also align with the on state 218 of the light source. Accordingly, the camera may capture the on state of the light source. However, in the case involving positive trigger 320 and negative trigger 322, the camera may undergo an exposure event as depicted by exposure interval 232 that may align with the duration between the positive trigger 320 and the negative trigger 322 and also may not align with the on state 220 of the light source. Accordingly, the camera may not capture the on state of the light source, even though the light source is powered on. This may cause the system to assume that the light sources off even though it is actually on and only experiencing a flickering event.

Figure 3B:
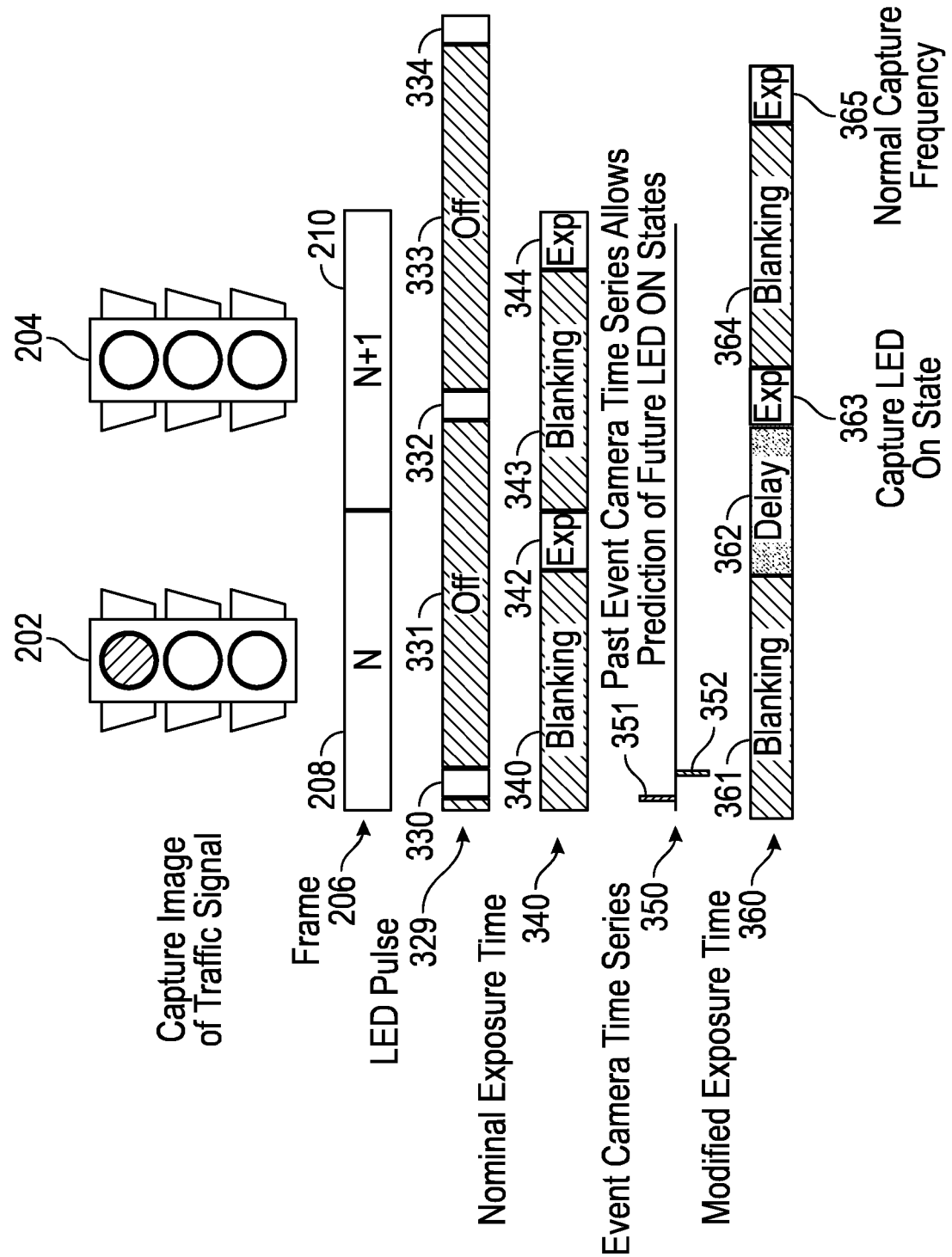
FIG. 3B shows further timing diagrams in addition to those of FIG. 3A including a modified timing diagram for the camera exposure time to image the light sources with reduced flicking artifacts, in accordance with example embodiments of the disclosure.

FIG. 3B provides further timing diagrams in addition to those of FIG. 3A including a modified timing diagram for the camera exposure time to reduce flicking artifacts in images, in accordance with example embodiments of the disclosure. Diagram 301 represents a diagram similar to diagram 200 of FIG. 2, shown and described above. In addition, diagram 301 further includes a timing diagram 329 of an LED power pulse. The timing diagram 329 shows intervals where a circuit can provide power to the LED and other intervals where the circuit does not provide power to the LED. For example, interval 330 represents a situation where the circuit provides power to the LED, while interval 331 represents a situation where the circuit is not actively providing power to the LED. Timing diagram 340 represents the nominal exposure time for a camera capturing images of the scene including traffic signals 202 and 204. In this respect, timing diagram 340 represents the unmodified timing diagram including blanking intervals such as blanking interval 340 and exposure intervals such as exposure interval 342. These intervals and other intervals shown (for example blanking interval 343 and exposure interval 344) may or may not overlap adequately with the on states (e.g., on state 330, on state 332, and/or on state 334) of timing diagram 329. Further, diagram 300 shows a timing diagram 350 associated with an event camera.

Diagram 301 further shows that the event-based camera may be turned on during positive trigger 351 that aligns with an on state 330, and that the event-based camera may be turned off after the negative trigger 352 that aligns with a transition to an off state of the light source. Timing diagram 350 further indicates that, unlike timing diagram 302 of FIG. 3A, above, the positive triggers and negative triggers of the timing diagram 350 may not necessarily repeat in a periodic fashion. Rather, the past history of the event camera may allow for the prediction of future light source on states. For instance, various AI-based algorithms may monitor historical data associated with the timing diagram 350 of the event camera in association with the nominal exposure times as represented by the timing diagram 340 and the on and off states of the light source as represented by timing diagram 329. With this historical information, the AI-based algorithms may predict a future light source on state rather than relying upon external triggers based on transitions between on and off states of the light source. Accordingly, the disclosed systems may add a delay such as delay 362 two a timing diagram to generate a modified timing diagram 360 for the exposure times of the event-based camera. In particular, timing diagram 360 shows a blanking interval 361 followed by a delay 362 having a predetermined duration as configured by the output of an AI-based algorithm.

After the delay 362, the timing diagram 360 includes an exposure interval 363 followed by an additional blanking interval 364 and another exposure interval 365. In some examples, the delay such as delay 362 may only be inserted a finite number of times between blanking intervals such as blanking interval 361 and exposure intervals such as exposure interval 363. In other examples, the delay may be inserted continuously and thereby adjust the frequency between exposure times in the timing diagram 360 of the event-based camera. In various examples, the duration of the delay, the position of the delay with respect to a blanking interval and/or an exposure interval, and the frequency of occurrence of the delay may be determined at least in part by the timing diagrams 329, 340, and/or 350 in addition to any other suitable parameters as determined by the AI-based algorithm.

Figure 4:
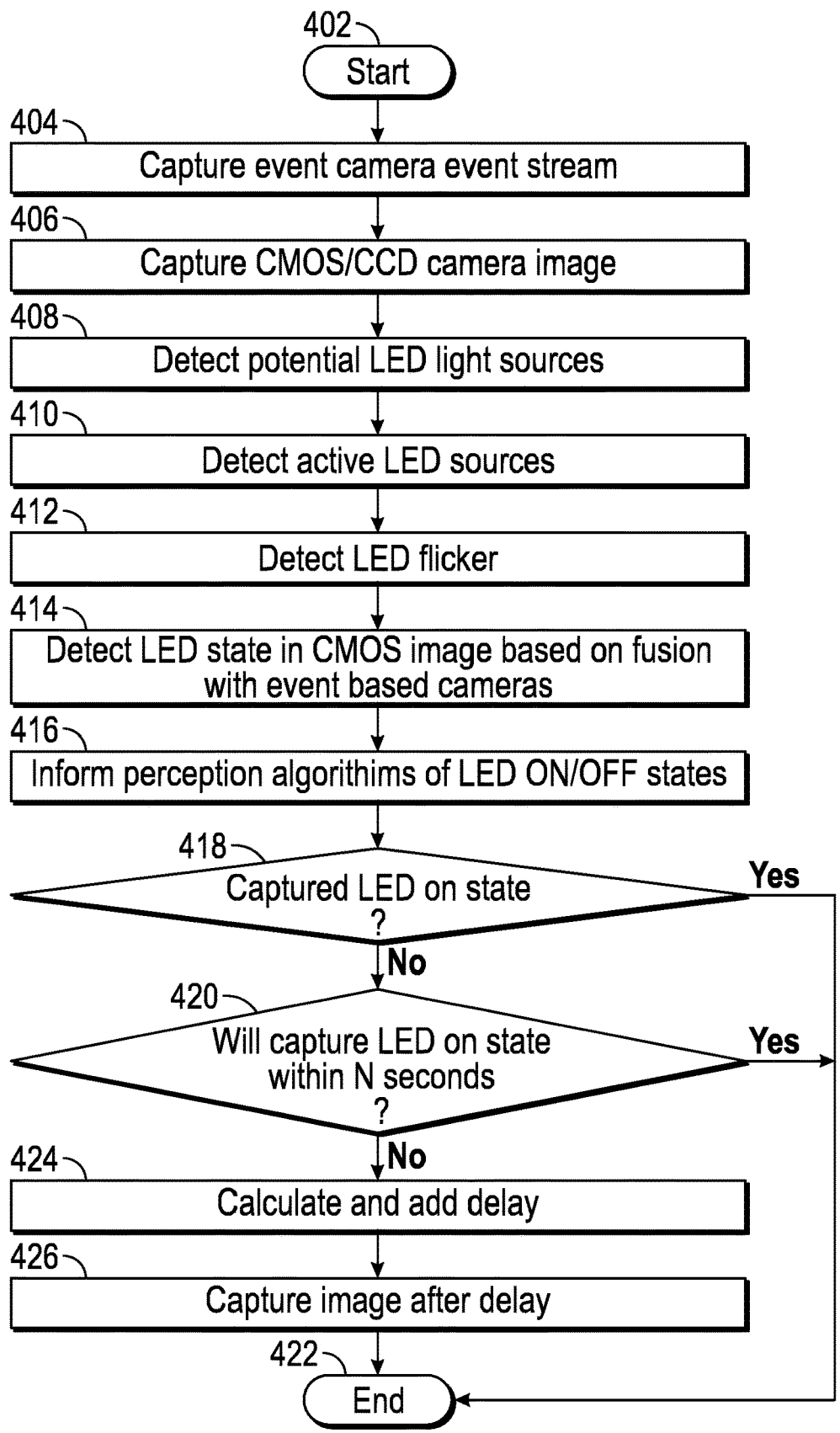
FIG. 4 shows an example process flow describing a method of reducing flicker artifacts in imaged light sources, in accordance with example embodiments of the disclosure.

FIG. 4 shows an example process flow describing a method of reducing flicker artifacts in imaged light sources, in accordance with example embodiments of the disclosure. At block 402, the disclosed systems may start the operations detailed below. At block 404, the disclosed systems may use an event-based camera to capture an event or a camera event stream. As noted, the event-based camera may be part of a vehicle such as an AV. In some examples, the event-based camera may have a predetermined resolution, a predetermined frame rate, and other parameters.

At block 406, the disclosed systems may use a conventional camera (e.g., a CMOS based and/or a CCD based camera) to capture an image of a vehicle's scene. In some examples, the conventional camera may have a predetermined resolution, a predetermined dynamic range, a predetermined bandwidth, and the like. The conventional camera may be configured to capture scenes corresponding to the environment in which the vehicle is navigating in. In some examples, the conventional camera may be mounted on a rotatable and/or translatable base which can change the field of view of the camera, e.g. mounted onto a mechanical spinning lidar. In this way, the conventional camera can be maneuvered to capture images of various objects such as light sources in the environment.

At block 408, the disclosed systems may detect a potential light source. In particular, the event-based camera and/or the conventional camera can use any suitable computer vision-based algorithm to detect possible presence of a light source. For example, the algorithm may be configured to search for particular shapes corresponding to shapes associated with traffic signals and/or vehicle-based turn signals.

At block 410, the disclosed systems may detect an active light source. In particular, the disclosed systems may be configured to detect light sources which are in meeting certain frequencies of light. For example, the event-based camera and/or the conventional camera may be calibrated such that they detect red light of a particular frequency associated with the red stop signal of traffic light and the active mode.

At block 412, the disclosed systems may detect light source flicker. In particular, the event-based camera and/or the conventional camera can be configured to detect a brightness change magnitude of the light source at a given frequency. For instance, the cameras along with a suitable AI-based algorithm may be configured to search for common frequencies of flicker in portions of the images captured corresponding to active light sources.

At block 414, the disclosed systems may detect a light source state in a conventional camera-captured image based on sensor fusion with the event-based camera. As noted, the disclosed systems may predict future on or off events for the light source based on historical data captured by the event-based camera.

At block 416, the disclosed systems may inform perception algorithms of a light source's on or off state based on the results of the above operations. In particular, the disclosed systems may be configured to update weights of any suitable AI-based algorithms based on the frequency and/or characteristics of the on and off states of the light source.

At block 418, the disclosed systems can determine whether a light source on state was captured. If yes, the operations of the disclosed systems can proceed to block 422 where the operations are ended.

At block 420, the disclosed systems can determine whether a light source is on state will be captured within the following N seconds, where N represents a positive number. If yes, the operations of the disclosed systems can proceed to block 422 where the operations are ended. If not, then the disclosed systems can determine, at block 424, to calculate and add a delay to the exposure time of the camera. The amount of delay to add to the exposure time of the camera may be based at least in part on the predicted future on state of the light source as determined by the AI algorithms in association with data generated by the event-based camera.

Further, at block 426, the disclosed systems can capture the image of the scene after the delay. In particular, this captured image may have proper timing alignment between the exposure time of the conventional camera and the light source's flickering frequency. Accordingly, the image may represent a faithful reproduction of the actual state of the light source. The operations of the disclosed systems can then proceed to block 422 where the operations are ended.

Figure 5:
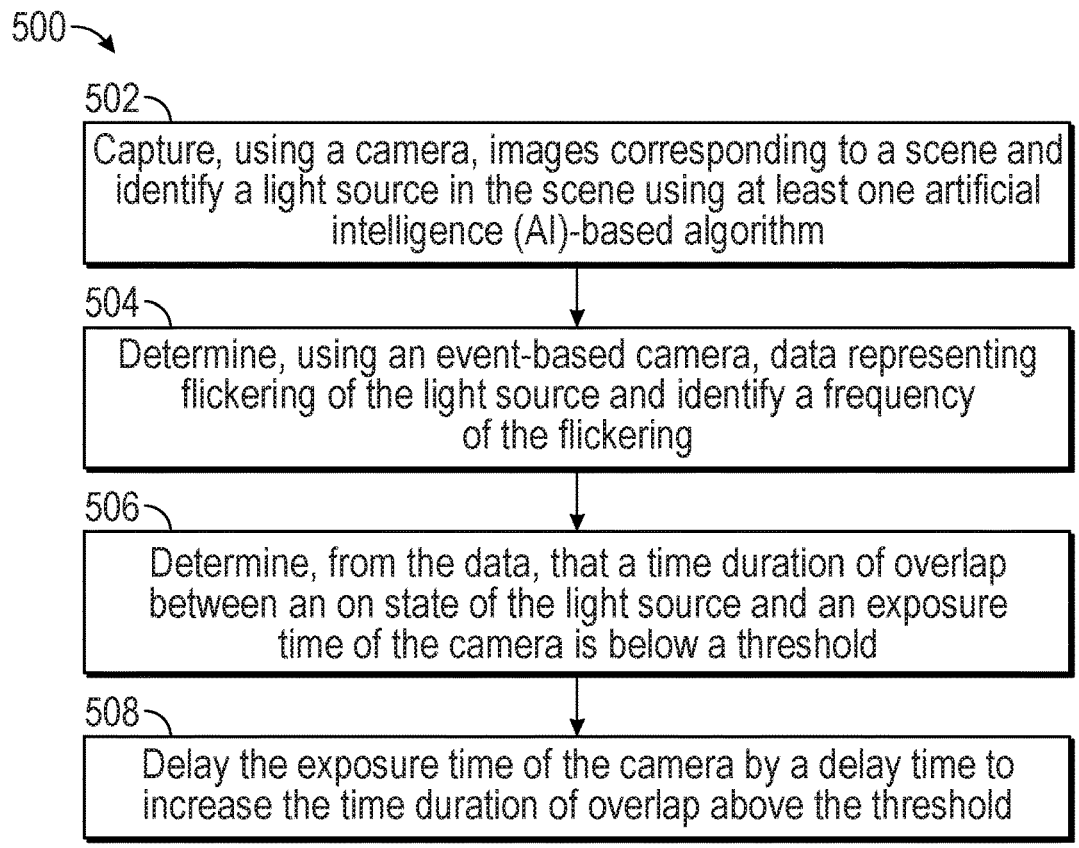
FIG. 5 shows another example process flow describing a method of reducing flicker artifacts in imaged light sources, in accordance with example embodiments of the disclosure.

FIG. 5 shows another example process flow describing a method of reducing flicker artifacts in imaged light sources, in accordance with example embodiments of the disclosure. At block 502, the method may include capturing, using a camera, images corresponding to a scene and identify a light source in the scene using at least one AI-based algorithm. In some examples, the camera can include a CMOS-based camera or a CCD-based camera. In some examples, the AI-based algorithm includes an object-tracking algorithm that tracks a location of the light source in the scene, and the method can further include changing a focus of the event-based camera to track the location of the light source.

At block 504, the method may include determining, using an event-based camera, data representing flickering of the light source and identify a frequency of the flickering. In some examples, the disclosed systems can further determine information associated with a motion of the camera, and can filter out additional data in the determined data based on the information. In other examples, the disclosed system can identify at least two frequencies associated with the on state and an off state of the light source and can select the frequency having a greater value. In some examples, the disclosed systems can use a HD map to obtain a location of the light source. In other aspects, the disclosed systems can identify a maximum intensity of light from multiple light sources in the scene, each light source having a respective intensity.

At block 506, the method may include determining, from the data, that a time duration of overlap between an on state of the light source and an exposure time of the camera is below a threshold. In particular, the disclosed systems may obtain a numerical representation of the degree of overlap between the on state of the light source and the exposure time of the camera as a percentage. In some examples, if is percentages below approximately 50%, then the disclosed systems may determine that the degree of overlap is insufficient and therefore below the threshold. In other aspects, the disclosed systems can scale the light source intensity for a display. For example, the disclosed systems can configure a camera view (e.g., a rearview, side view, or surround-view camera) to capture flicker where some frames are comparatively brighter, and others frame where the light source is off. The disclosed systems can use images generated by the event camera as variously described herein to display a view comparable to a human seeing the scene.

At block 508, the method may include delaying the exposure time of the camera by a delay time or by performing any other suitable action to increase the time duration of overlap above the threshold. In particular, the disclosed systems may delay the exposure time of the camera by the delay time to increase the time duration of overlap above and approximately 50% overlap time. In some examples, the disclosed systems may modify (for example, increase or decrease) at least one of a duration of the exposure time or a frequency of image capture by the camera based on the time duration of overlap or the delay time. In some examples, the disclosed system can generate instructions that cause a vehicle to break within a predetermined approximate distance of the light source.

As noted, embodiments of devices and systems (and their various components) described herein can employ AI to facilitate automating one or more features described herein, for example, in performing object recognition on the scene captured by the cameras of the vehicle, or in predicting the future on state of a light source based on historical data. The components can employ various AI-based schemes for carrying out various embodiments and/or examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources (e.g., different sensor inputs). Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, \ldots, zn)$, to a confidence that the input belongs to a class, as by $f(z)=\text{confidence(class)}$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 6:
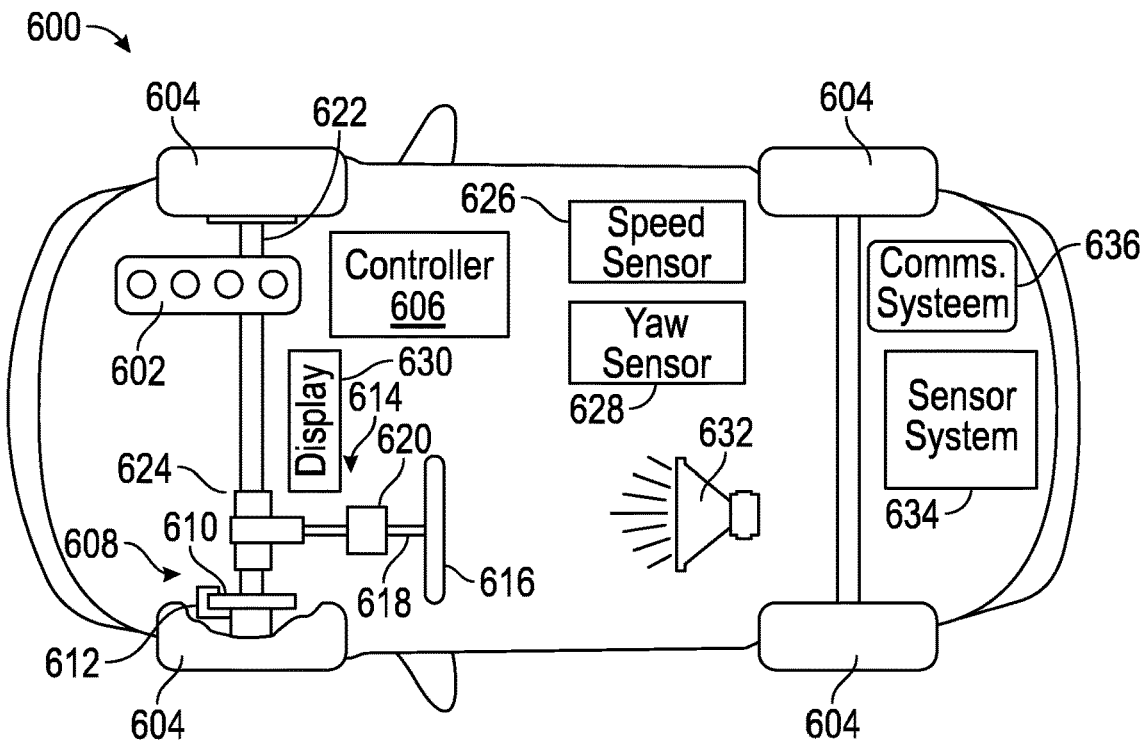
FIG. 6 is a schematic illustration of an example autonomous vehicle (AV) that can use the operations disclosed herein to reduce flicker artifacts in imaged light sources to better perceive and navigate in the AV's environment, in accordance with one or more embodiments of the disclosure.

FIG. 6 is a schematic illustration of an example autonomous vehicle, in accordance with one or more embodiments of the disclosure. As noted, the vehicle (for example, vehicle 102 shown and described in connection with FIG. 1, above), may include an AV. Referring to FIG. 6, an example vehicle 600 may include a power plant 602 (such as a combustion engine and/or an electric motor) that provides torque to driven wheels 604 that propel the vehicle forward or backward.

Autonomous vehicle operation, including propulsion, steering, braking, navigation, and the like, may be controlled autonomously by a vehicle controller 606. For example, the vehicle controller 606 may be configured to receive feedback from one or more sensors (for example, sensor system 634, etc.) and other vehicle components to determine road conditions, vehicle positioning, and so forth. The vehicle controller 606 may also ingest data form various sensors such as speed monitor and yaw sensor, as well as the tires, brakes, motor, and other vehicle components. The vehicle controller 606 may use the feedback and route/map data of the route to determine actions to be taken by the autonomous vehicle, which may include operations related to the engine, steering, braking, and so forth. Control of the various vehicle systems may be implemented using any suitable mechanical means, such as servo motors, robotic arms (for example, to control steering wheel operation, acceleration pedal, brake pedal, etc.), and so forth. The controller 606 may be configured to interact with the user by communicating with the user's user device.

The vehicle controller 606 may include one or more computer processors coupled to at least one memory. The vehicle 600 may include a braking system 608 having disks 610 and calipers 612. The vehicle 600 may include a steering system 614. The steering system 614 may include a steering wheel 616, a steering shaft 618 interconnecting the steering wheel to a steering rack 620 (or steering box). The front and/or rear wheels 604 may be connected to the steering rack 620 via axle 622. A steering sensor 624 may be disposed proximate the steering shaft 618 to measure a steering angle. The vehicle 600 also includes a speed sensor 626 that may be disposed at the wheels 604 or in the transmission. The speed sensor 626 is configured to output a signal to the controller 606 indicating the speed of the vehicle. A yaw sensor 628 is in communication with the controller 606 and is configured to output a signal indicating the yaw of the vehicle 600.

The vehicle 600 includes a cabin having a display 630 in electronic communication with the controller 606. The display 630 may be a touchscreen that displays information to the passengers of the vehicle and/or functions as an input. A person having ordinary skill in the art will appreciate that many different display and input devices are available and that the present disclosure is not limited to any particular display. An audio system 632 may be disposed within the cabin and may include one or more speakers for providing information to users that pickup items. The audio system 632 may also include a microphone for receiving voice inputs or detecting sounds at the residence (for example, animal sounds). The vehicle may include a communications system 636 that is configured to send and/or receive wireless communications via one or more networks. The communications system 636 may be configured for communication with devices in the car or outside the car, such as a user's device, the delivery vehicles, etc.

The vehicle 600 may also include a sensor system for sensing areas external to the vehicle. The sensor system may include a plurality of different types of sensors and devices such as cameras, ultrasonic sensors, RADAR, LIDAR, and/or combinations thereof. The sensor system may be in electronic communication with the controller 606 for controlling the functions of various components. The controller may communicate via a serial bus or via dedicated electrical conduits. The controller generally includes any number of microprocessors, ASICs, ICs, memory (for example, FLASH, ROM, RAM, EPROM and/or EEPROM) and software code to co-act with one another to perform a series of operations. The controller also includes predetermined data, or "look up tables" that are based on calculations and test data and are stored within the memory. The controller may communicate with other vehicle systems and controllers over one or more wired or wireless vehicle connections using common bus protocols (for example, CAN and LIN). Used herein, a reference to "a controller" refers to one or more controllers and/or computer processors. The controller 606 may receive signals from the sensor system 634 and may include memory containing machine-readable instructions for processing the data from the sensor system. The controller 606 may be programmed to output instructions to at least the display 630, the audio system 632, the steering system 614, the braking system 608, and/or the power plant 602 to autonomously operate the vehicle 600.

Figure 7:
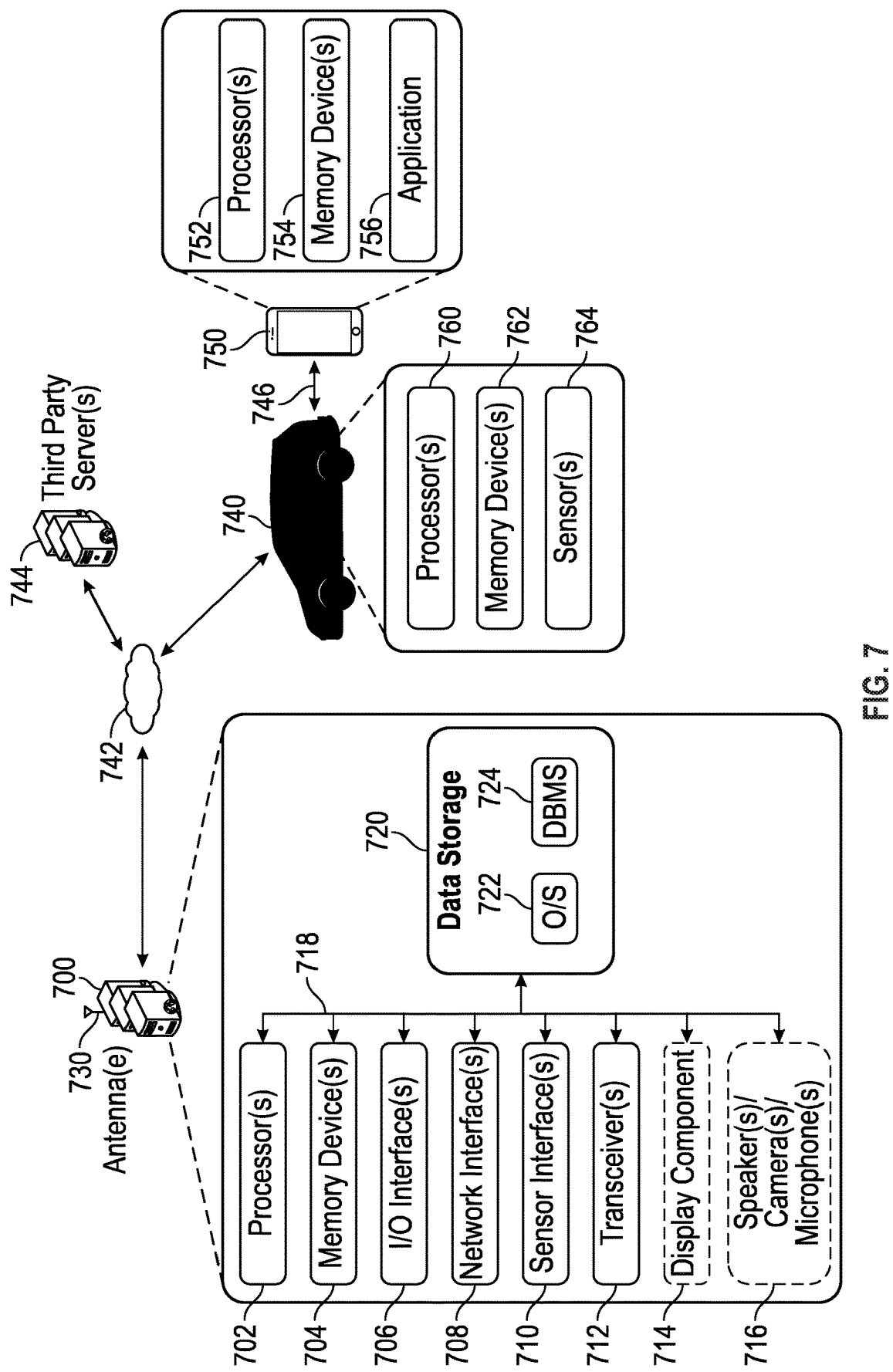
FIG. 7 is a schematic illustration of an example server architecture for one or more servers that can be used for reducing flicker artifacts in imaged light sources, in accordance with one or more embodiments of the disclosure.

FIG. 7 is a schematic illustration of an example server architecture for one or more server(s) 700 in accordance with one or more embodiments of the disclosure. The server 700 illustrated in the example of FIG. 7 may correspond to a server that may be used by a vehicle (for example, any of vehicle 102 as shown and described in connection with FIG. 1, above) on a network associated with the vehicle. In an embodiment, the server 700 may include a cloud-based server that may serve to store and transmit information (for example, HD map information including the location of light sources such as traffic signals, traffic information, and the like). Some or all of the individual components may be optional and/or different in various embodiments. In some embodiments, at least one of the servers described FIG. 7 may be located at an autonomous vehicle.

The server 700 may be in communication with an AV 740, and one or more user devices 750. The AV 740 may be in communication with the one or more user devices 750. Further, the server 700, the AV 740, and/or the user devices 750 may be configured to communicate via one or more networks 742. The AV 740 may additionally be in wireless communication over one or more network(s) 742 with the user devices 750 via a connection protocol such as Bluetooth or NFC. Such network(s) 742 may include, but are not limited to, any one or more different types of communications networks such as, for example, cable networks, public networks (for example, the Internet), private networks (for example, frame-relay networks), wireless networks, cellular networks, telephone networks (for example, a public switched telephone network), or any other suitable private or public packet-switched or circuit-switched networks. Further, such network(s) may have any suitable communication range associated therewith. In addition, such network(s) may include communication links and associated networking devices (for example, link-layer switches, routers, etc.) for transmitting network traffic over any suitable type of medium including, but not limited to, coaxial cable, twisted-pair wire (for example, twisted-pair copper wire), optical fiber, a HFC medium, a microwave medium, a radio frequency communication medium, a satellite communication medium, or any combination thereof.

In an illustrative configuration, the server 700 may include one or more processors 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more optional display components 714, one or more optional speakers(s)/camera(s)/microphone(s) 716, and data storage 720. The server 700 may further include one or more bus(es) 718 that functionally couple various components of the server 700. The server 700 may further include one or more antenna(e) 730 that may include, without limitation, a cellular antenna for transmitting or receiving signals to/from a cellular network infrastructure, a GNSS antenna for receiving GNSS signals from a GNSS satellite, a Bluetooth antenna for transmitting or receiving Bluetooth signals, a NFC antenna for transmitting or receiving NFC signals, and so forth. These various components will be described in more detail hereinafter.

The bus(es) 718 may include at least one of a system bus, a memory bus, an address bus, or a message bus, and may permit the exchange of information (for example, data (including computer-executable code), signaling, etc.) between various components of the server 700. The bus(es) 718 may include, without limitation, a memory bus or a memory controller, a peripheral bus, an accelerated graphics port, and so forth. The bus(es) 718 may be associated with any suitable bus architecture.

The memory 704 of the server 700 may include volatile memory (memory that maintains its state when supplied with power) such as RAM and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (for example, FRAM) may enable faster read/write access than certain types of volatile memory.

The data storage 720 may include removable storage and/or non-removable storage including, but not limited to, magnetic storage, optical disk storage, and/or tape storage. The data storage 720 may provide non-volatile storage of computer-executable instructions and other data.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. More specifically, the data storage 720 may store one or more operating systems (O/S) 722; one or more database management systems (DBMS) 724; and one or more program module(s), applications, engines, computer-executable code, scripts, or the like. Some or all of these component(s) may be sub-component(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The processor(s) 702 may be configured to access the memory 704 and execute the computer-executable instructions loaded therein. For example, the processor(s) 702 may be configured to execute the computer-executable instructions of the various program module(s), applications, engines, or the like of the server 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit.

Referring now to other illustrative components depicted as being stored in the data storage 720, the O/S 722 may be loaded from the data storage 720 into the memory 704 and may provide an interface between other application software executing on the server 700 and the hardware resources of the server 700.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (for example, relational model, object model, etc.) and may support any of a variety of query languages.

Referring now to other illustrative components of the server 700, the input/output (I/O) interface(s) 706 may facilitate the receipt of input information by the server 700 from one or more I/O devices as well as the output of information from the server 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. The I/O interface(s) 706 may also include a connection to one or more of the antenna(e) 730 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The server 700 may further include one or more network interface(s) 708 via which the server 700 may communicate with any of a variety of other systems, platforms, networks, devices, and so forth. The network interface(s) 708 may enable communication, for example, with one or more wireless routers, one or more host servers, one or more web servers, and the like via one or more networks.

The sensor(s)/sensor interface(s) 710 may include or may be capable of interfacing with any suitable type of sensing device such as, for example, inertial sensors, force sensors, thermal sensors, photocells, and so forth.

The display component(s) 714 may include one or more display layers, such as LED or LCD layers, touch screen layers, protective layers, and/or other layers. The optional camera(s) of the speakers(s)/camera(s)/microphone(s) 716 may be any device configured to capture ambient light or images. The optional microphone(s) of the speakers(s)/camera(s)/microphone(s) 716 may be any device configured to receive analog sound input or voice data. The microphone(s) of the speakers(s)/camera(s)/microphone(s) 716 may include microphones used to capture sound.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module.

It should further be appreciated that the server 700 may include alternate and/or additional hardware, software, or firmware components beyond those described or depicted without departing from the scope of the disclosure.

The user device 750 may include one or more computer processor(s) 752, one or more memory devices 754, and one or more applications, such as a vehicle application 756. Other embodiments may include different components.

The processor(s) 752 may be configured to access the memory 754 and execute the computer-executable instructions loaded therein. For example, the processor(s) 752 may be configured to execute the computer-executable instructions of the various program module(s), applications, engines, or the like of the device to cause or facilitate various operations to be performed in accordance with one or more embodiments of the disclosure. The processor(s) 752 may include any suitable processing unit capable of accepting data as input, processing the input data in accordance with stored computer-executable instructions, and generating output data. The processor(s) 752 may include any type of suitable processing unit.

The memory 754 may include volatile memory (memory that maintains its state when supplied with power). Persistent data storage, as that term is used herein, may include non-volatile memory. In certain example embodiments, volatile memory may enable faster read/write access than non-volatile memory. However, in certain other example embodiments, certain types of non-volatile memory (for example, FRAM) may enable faster read/write access than certain types of volatile memory.

Referring now to functionality supported by the user device 750, the AV application 756 may be a mobile application executable by the processor 752 that can be used to present options and/or receive user inputs of information related to the disclosed embodiments. In addition, the user device 750 may communicate with the AV 740 via the network 742 and/or a direct connect, which may be a wireless or wired connection. The user device 750 may include a camera, scanner, bio reader or the like to capture biometric data of a user, perform certain processing step on the biometric date, such as extracting features from captures biometric data, and then communicated those extracted features to one or more remote servers, such as one or more of cloud-based servers.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module.

It should further be appreciated that the server 700 may include alternate and/or additional hardware, software, or firmware components beyond those described or depicted without departing from the scope of the disclosure.

Example Embodiments

Example 1 may include a method, comprising: receiving images corresponding to a scene captured by a camera; determining a light source in the scene using at least one artificial intelligence (AI)-based algorithm; receiving, from an event-based camera, data representing flickering of the light source; determining, based on the data, that a time duration of overlap between an on state of the light source and an exposure time of the camera is below a threshold; and delaying the exposure time of the camera by a delay time to increase the time duration of overlap.

Example 2 may include the method of example 1 and/or some other example herein, further comprising modifying at least one of a duration of the exposure time or a frequency of image capture by the camera based on at least one of the time duration of overlap or the delay time.

Example 3 may include the method of example 1 and/or some other example herein, further comprising determining a frequency of the flickering, by determining at least two frequencies associated with the on state and an off state of the light source, and selecting the frequency having a greater value.

Example 4 may include the method of example 1 and/or some other example herein, wherein the AI-based algorithm includes an object-tracking algorithm that tracks a location of the light source in the scene, and the method further comprises changing a focus of the event-based camera to track the location of the light source.

Example 5 may include the method of example 1 and/or some other example herein, further comprising: determining information associated with a motion of the camera; and filtering out additional data in the determined data based on the information.

Example 6 may include the method of example 1 and/or some other example herein, wherein determining the light source in the scene further comprises: determining a high-definition (HD) map information comprising a location of the light source.

Example 7 may include the method of example 1 and/or some other example herein, wherein determining the light source in the scene further comprises determining a maximum intensity of light from multiple light sources in the scene, each light source having a respective intensity.

Example 8 may include the method of example 1 and/or some other example herein, further comprising generating instructions that cause a vehicle to stop within a distance of the light source.

Example 9 may include the method of example 1 and/or some other example herein, wherein the camera comprises a complementary metal-oxide-semiconductor (CMOS) camera or a charge coupled device (CCD) camera.

Example 10 may include a device, comprising: at least one memory device that stores computer-executable instructions; and at least one processor configured to access the at least one memory device, wherein the at least one processor is configured to execute the computer-executable instructions to: receive images corresponding to a scene captured by a camera; determine a light source in the scene using at least one artificial intelligence (AI)-based algorithm; receiving, from an event-based camera, data representing flickering of the light source; determine, based on the data, that a time duration of overlap between an on state of the light source and an exposure time of the camera is below a threshold; and delay the exposure time of the camera by a delay time to increase the time duration of overlap Example 11 may include the device of example 10 and/or some other example herein, further comprising instructions to modify at least one of a duration of the exposure time or a frequency of image capture by the camera based on at least one of the time duration of overlap or the delay time.

Example 12 may include the device of example 10 and/or some other example herein, further comprising instructions to determine a frequency of the flickering by identifying at least two frequencies associated with the on state and an off state of the light source and selecting the frequency having a greater value.

Example 13 may include the device of example 10 and/or some other example herein, wherein the instructions to determine the light source in the scene further comprises: determining an HD map information comprising a location of the light source.

Example 14 may include the device of example 10 and/or some other example herein, wherein the instructions to identify the light source in the scene further comprises instructions to identify a maximum intensity of light from multiple light sources in the scene, each light source having a respective intensity.

Example 15 may include a non-transitory computer-readable medium storing computer-executable instructions which, when executed by a processor, cause the processor to perform operations comprising: receiving images corresponding to a scene captured by a camera; determining a light source in the scene using at least one artificial intelligence (AI)-based algorithm; receiving, from an event-based camera, data representing flickering of the light source; determining, based on the data, that a time duration of overlap between an on state of the light source and an exposure time of the camera is below a threshold; and delaying the exposure time of the camera by a delay time to increase the time duration of overlap.

Example 16 may include the non-transitory computer-readable medium of example 15 and/or some other example herein, further comprising instructions to modify at least one of a duration of the exposure time or a frequency of image capture by the camera based on at least one of the time duration of overlap or the delay time.

Example 17 may include the non-transitory computer-readable medium of example 15 and/or some other example herein, further comprising instructions to determine a frequency of the flickering by determining at least two frequencies associated with the on state and an off state of the light source and selecting the frequency having a greater value.

Example 18 may include the non-transitory computer-readable medium of example 15 and/or some other example herein, wherein the instructions to identify the light source in the scene further comprises: determining an HD map information comprising a location of the light source.

Example 19 may include the non-transitory computer-readable medium of example 15 and/or some other example herein, wherein the instructions to determine the light source in the scene further comprises instructions to determine a maximum intensity of light from multiple light sources in the scene, each light source having a respective intensity.

Example 20 may include the non-transitory computer-readable medium of example 15 and/or some other example herein, further comprising generating instructions that cause a vehicle to stop within an approximate distance of the light source.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
   receiving images corresponding to a scene captured by a first camera;
   determining, based on the images corresponding to the scene captured by the first camera, a light source in the scene using at least one artificial intelligence (AI)-based algorithm;
   receiving, from a second camera, data representing flickering of the light source, wherein the second camera is an event-based camera, and wherein the second camera is associated with a higher temporal response rate and higher dynamic range than the first camera;
   determining, based on the data, that a time duration of overlap between an on state of the light source and an exposure time of the first camera is below a threshold; and
   delaying the exposure time of the first camera by a delay time to increase the time duration of overlap.

2. The method of claim 1, further comprising modifying at least one of a duration of the exposure time or a frequency of image capture by the camera based on at least one of the time duration of overlap or the delay time.

3. The method of claim 1, further comprising determining a frequency of the flickering, by determining at least two frequencies associated with the on state and an off state of the light source, and selecting the frequency having a greater value.

4. The method of claim 1, wherein the AI-based algorithm includes an object-tracking algorithm that tracks a location of the light source in the scene, and the method further comprises changing a focus of the event-based camera to track the location of the light source.

5. The method of claim 1, further comprising:
   determining information associated with a motion of the camera; and
   filtering out additional data in the received data based on the information.

6. The method of claim 1, wherein determining the light source in the scene further comprises:
   receiving a high-definition (HD) map information comprising a location of the light source, wherein the HD map is received from a source other than the first or second camera.

7. The method of claim 1, wherein determining the light source in the scene further comprises determining a maximum intensity of light from multiple light sources in the scene, each light source having a respective intensity.

8. The method of claim 1, further comprising generating instructions that cause a vehicle to stop within a distance of the light source.

9. The method of claim 1, wherein the camera comprises a complementary metal-oxide-semiconductor (CMOS) camera or a charge coupled device (CCD) camera.

10. A device, comprising:
at least one memory device that stores computer-executable instructions; and
at least one processor configured to access the at least one memory device, wherein the at least one processor is configured to execute the computer-executable instructions to:
receive images corresponding to a scene captured by a first camera;
determine, based on the images corresponding to the scene captured by the first camera, a light source in the scene using at least one artificial intelligence (AI)-based algorithm;
receiving, a second camera, data representing flickering of the light source, wherein the second camera is an event-based camera, and wherein the second camera is associated with a higher temporal response rate and higher dynamic range than the first camera;
determine, based on the data, that a time duration of overlap between an on state of the light source and an exposure time of the first camera is below a threshold; and
delay the exposure time of the first camera by a delay time to increase the time duration of overlap.

11. The device of claim 10, further comprising instructions to modify at least one of a duration of the exposure time or a frequency of image capture by the camera based on at least one of the time duration of overlap or the delay time.

12. The device of claim 10, further comprising instructions to determine a frequency of the flickering by identifying at least two frequencies associated with the on state and an off state of the light source and selecting the frequency having a greater value.

13. The device of claim 10, wherein the instructions to determine the light source in the scene further comprises:
receiving a high-definition (HD) map information comprising a location of the light source, wherein the HD map is received from a source other than the first or second camera.

14. The device of claim 10, wherein the instructions to identify the light source in the scene further comprises instructions to identify a maximum intensity of light from multiple light sources in the scene, each light source having a respective intensity.

15. A non-transitory computer-readable medium storing computer-executable instructions which, when executed by a processor, cause the processor to perform operations comprising:
receiving images corresponding to a scene captured by a first camera;
determining, based on the images corresponding to the scene captured by the first camera, a light source in the scene using at least one artificial intelligence (AI)-based algorithm;
receiving, from a second camera, data representing flickering of the light source, wherein the second camera is an event-based camera, and wherein the second camera is associated with a higher temporal response rate and higher dynamic range than the first camera;
determining, based on the data, that a time duration of overlap between an on state of the light source and an exposure time of the first camera is below a threshold; and
delaying the exposure time of the first camera by a delay time to increase the time duration of overlap.

16. The non-transitory computer-readable medium of claim 15, further comprising instructions to modify at least one of a duration of the exposure time or a frequency of image capture by the camera based on at least one of the time duration of overlap or the delay time.

17. The non-transitory computer-readable medium of claim 15, further comprising instructions to determine a frequency of the flickering by determining at least two frequencies associated with the on state and an off state of the light source and selecting the frequency having a greater value.

18. The non-transitory computer-readable medium of claim 15, wherein the instructions to identify the light source in the scene further comprises:
receiving a high-definition (HD) map information comprising a location of the light source, wherein the HD map is received from a source other than the first or second camera.

19. The non-transitory computer-readable medium of claim 15, wherein the instructions to determine the light source in the scene further comprises instructions to determine a maximum intensity of light from multiple light sources in the scene, each light source having a respective intensity.

20. The non-transitory computer-readable medium of claim 15, further comprising generating instructions that cause a vehicle to stop within an approximate distance of the light source.

* * * * *